G. A. GILBERTSON.
ANIMAL SHEARS.
APPLICATION FILED JAN. 27, 1913.

1,063,429.

Patented June 3, 1913.

Witnesses.
A. H. Opsahl.
E. C. Skinkle.

Inventor.
Gustav A. Gilbertson
By his Attorneys
Williamson Merchant

UNITED STATES PATENT OFFICE.

GUSTAV A. GILBERTSON, OF BENSON, MINNESOTA.

ANIMAL-SHEARS.

1,063,429.  Specification of Letters Patent.  Patented June 3, 1913.

Application filed January 27, 1913. Serial No. 744,416.

*To all whom it may concern:*

Be it known that I, GUSTAV A. GILBERTSON, a citizen of the United States, residing at Benson, in the county of Swift and State of Minnesota, have invented certain new and useful Improvements in Animal-Shears; and I do hereby declare the following to be a full, clear, and exact description of the invention, such as will enable others skilled in the art to which it appertains to make and use the same.

My invention has for its object to provide an improvement in animal shears; and to such ends, generally stated, the invention consists of the novel devices and combinations of devices hereinafter described and defined in the claim.

Particularly, the invention is designed to increase the efficiency of sheep shears or animal shears of the type wherein a vibratory pronged cutter coöperates with a relatively fixed comb to produce the shearing action. These combs, as hitherto constructed, have been provided with outer edge teeth extending forward on the same plane or in the same general direction as the intermediate teeth of the comb. In the use of these shears, there is a tendency to run the shears into the uncut wool so far that a ridge of uncut wool will be left adjacent to the cut surface of the wool. To prevent this action, it has hitherto been the common practice to so guide the shears that several of the teeth at the left or adjacent to the cut surface of the wool will project, and hence, remain out of action, thus very considerably decreasing the efficiency of the shears by narrowing up the swath cut by the shears. I obviate all of these difficulties by an extremely simple device which consists simply in giving to one of the extreme end teeth or prongs of the comb, quite an abrupt outward curve or bend, so that the gather thereof is very greatly increased.

The invention is illustrated in the accompanying drawings, wherein like characters indicate like parts throughout the several views.

Figure 1:
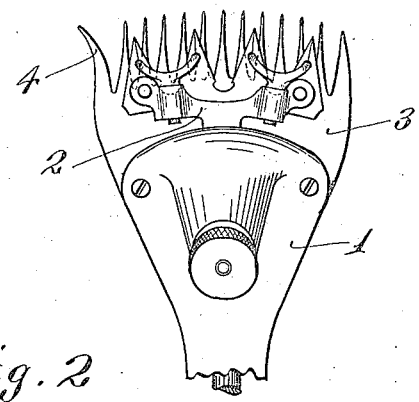
Figure 2:
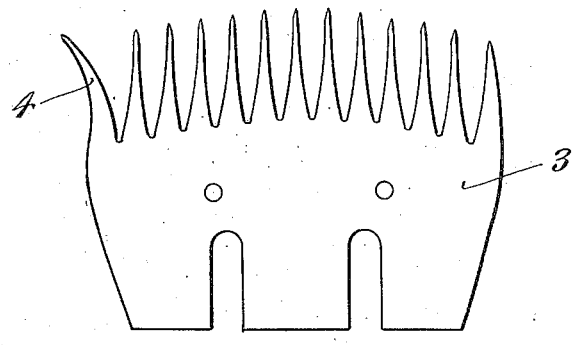

Referring to the drawings, Figure 1 is a plan view of the shears; and Fig. 2 is a plan view of the comb removed from the shears.

Of the parts of the shears, it is only necessary for the purpose of this case to particularly note the head 1, the vibratory pronged cutter 2 and the comb 3, all of which parts are, or may be of standard construction, except that the said comb is provided with a one end tooth 4, preferably placed at the left hand side of the said comb, which is given a decided or considerable outward curve or bend so that its gather is very greatly increased. With the comb provided with this curved or outwardly bent tooth 4, it is possible to use the tool to cut the full width swath for which the shears are designed to cut. This result is facilitated by two actions of the tooth, to-wit; in the first place, the said tooth reaches out and gathers in to the cutters a considerable additional wool which is adjacent to the previously cut surface, and in the second place, the said curved tooth has a lateral crowding or drawing action on the tool which tends to pull the same toward the surface of the previously cut surface of the wool.

In actual practice, it has been found that this improved comb very greatly increases the efficiency of the shears and makes the proper manipulation of the shears for good cutting, a much easier matter than when the ordinary comb is employed.

What I claim is:

In animal shears having a comb and a vibratory cutter coöperating therewith, the said comb having an outwardly bent or curved end tooth at one edge, and which tooth is outside of the swath when the shears are in use, substantially as and for the purposes set forth.

In testimony whereof I affix my signature in presence of two witnesses.

GUSTAV A. GILBERTSON.

Witnesses:
 SYVERT GILBERTSON,
 CARL P. WALLA.